(12) United States Patent
Lapiello

(10) Patent No.: US 10,789,460 B1
(45) Date of Patent: Sep. 29, 2020

(54) METHODS AND SYSTEMS FOR SCREENING DOCUMENTS

(71) Applicant: THE BOSTON CONSULTING GROUP, INC., Boston, MA (US)

(72) Inventor: Emilio Alfredo Lapiello, Boston, MA (US)

(73) Assignee: THE BOSTON CONSULTING GROUP, INC., Boston, MA (US)

( * ) Notice: Subject to any disclaimer, the term of this patent is extended or adjusted under 35 U.S.C. 154(b) by 0 days.

(21) Appl. No.: 16/203,102

(22) Filed: Nov. 28, 2018

Related U.S. Application Data

(60) Provisional application No. 62/621,404, filed on Jan. 24, 2018.

(51) Int. Cl.
| | |
|---|---|
| *G06F 16/00* | (2019.01) |
| *G06K 9/00* | (2006.01) |
| *G06N 3/04* | (2006.01) |
| *G06F 16/31* | (2019.01) |
| *G06F 16/35* | (2019.01) |

(52) U.S. Cl.
CPC ......... *G06K 9/00442* (2013.01); *G06F 16/31* (2019.01); *G06F 16/35* (2019.01); *G06N 3/04* (2013.01)

(58) Field of Classification Search
CPC ..... G06K 9/00442; G06F 16/35; G06F 16/31; G06N 3/04
See application file for complete search history.

(56) References Cited

U.S. PATENT DOCUMENTS

| | | | |
|---|---|---|---|
| 2007/0033064 A1* | 2/2007 | Abrahamsohn | G06Q 10/06 705/321 |
| 2007/0203776 A1* | 8/2007 | Austin | G06Q 10/00 705/321 |
| 2011/0302100 A1* | 12/2011 | Selvakummar | G06Q 10/063112 705/321 |

(Continued)

OTHER PUBLICATIONS

"Deep Learning", URL: https://en.wikipedia.org/wiki/Deep_learning#Deep_neural_networks, downloaded Jun. 17, 2019, 26 pages.

(Continued)

*Primary Examiner* — Leslie Wong
(74) *Attorney, Agent, or Firm* — DLA Piper LLP (US)

(57) ABSTRACT

Methods and Systems for determining a probability of relevance for a new resume. Existing resumes that have a high probability of relevance for a position can be chosen. A vocabulary of words can be built. Each word can be mapped into a vector such that each existing resume can be represented by a sequence of vectors and each sentence and/or paragraph in the resume can be represented by a subsequence of vectors including a subset of the sequence of vectors. Data augmentation, including changing the order of subsequences in order to create additional resumes represented by subsequences, can be applied. A deep neural network can be trained using the subsequences that represent the existing resumes and the subsequences that represent the additional resumes. New resumes can be classified using a trained deep neural network. A relevant resume can be output using the trained deep neural network.

18 Claims, 19 Drawing Sheets

(56) References Cited

U.S. PATENT DOCUMENTS

| | | | | |
|---|---|---|---|---|
| 2012/0166922 | A1* | 6/2012 | Rolles | G06F 16/958 715/202 |
| 2012/0310627 | A1* | 12/2012 | Qi | G06F 17/2785 704/9 |
| 2014/0033307 | A1* | 1/2014 | Schmidtler | H04L 63/1483 726/22 |
| 2014/0108308 | A1* | 4/2014 | Stout | G06N 3/08 706/12 |
| 2014/0122355 | A1* | 5/2014 | Hardtke | G06Q 10/105 705/321 |
| 2014/0250024 | A1* | 9/2014 | Takalpati | G06Q 10/1053 705/321 |
| 2015/0019204 | A1* | 1/2015 | Simard | G06F 17/2785 704/9 |
| 2017/0154314 | A1* | 6/2017 | Mones | G06Q 10/1053 |
| 2017/0213190 | A1* | 7/2017 | Hazan | G10L 25/63 |
| 2017/0270484 | A1* | 9/2017 | Cengiz | G06Q 10/1053 |
| 2018/0173699 | A1* | 6/2018 | Tacchi | G06F 17/2785 |
| 2018/0182015 | A1* | 6/2018 | Su | G06Q 30/0631 |
| 2018/0336183 | A1* | 11/2018 | Lee | G06F 17/2785 |
| 2018/0365229 | A1* | 12/2018 | Buhrmann | G06N 3/0454 |
| 2018/0373696 | A1* | 12/2018 | Terry | G06N 20/00 |
| 2019/0179903 | A1* | 6/2019 | Terry | G06F 17/279 |

OTHER PUBLICATIONS

"Stochastic gradien descfent", URL: https://en.wikipedia.org/wiki/Stochastic_gradient_descent, downloaded Jun. 17, 2019, 10 pages.

\* cited by examiner

FIGURE 2
Examples:
Word to vector encoding
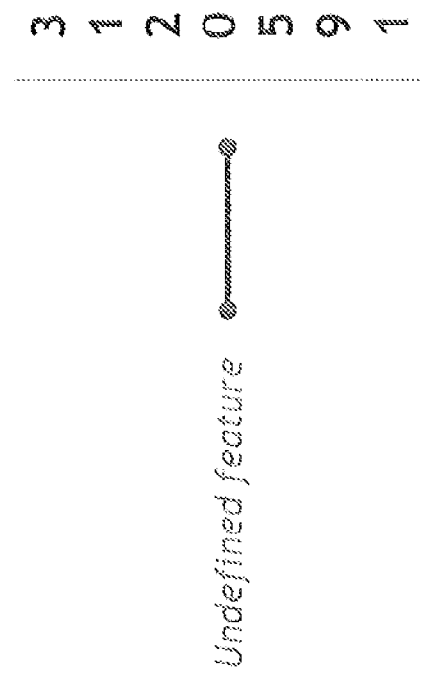
'Latent' feature encoding
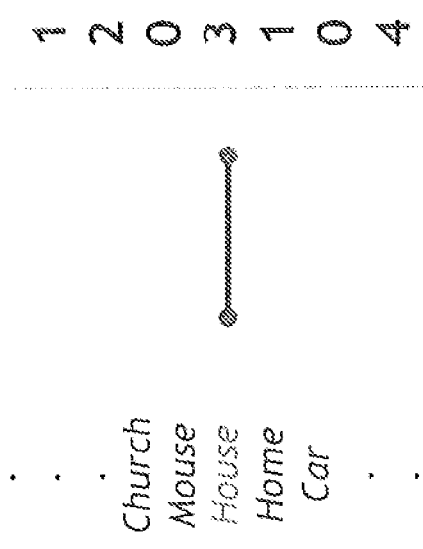

FIGURE 3: NLP application shows semantic recognition properties

Vectors algebra works quite well

E.g. France - Paris + Italy = Rome

| Relationship | Example 1 | Example 2 | Example 3 |
|---|---|---|---|
| France - Paris | Italy: Rome | Japan: Tokyo | Florida: Tallahassee |
| big - bigger | small: larger | cold: colder | quick: quicker |
| Miami - Florida | Baltimore: Maryland | Dallas: Texas | Kona: Hawaii |
| Einstein - scientist | Messi: midfielder | Mozart: violinist | Picasso: painter |
| Sarkozy - France | Berlusconi: Italy | Merkel: Germany | Koizumi: Japan |
| copper - Cu | zinc: Zn | gold: Au | uranium: plutonium |
| Berlusconi - Silvio | Sarkozy: Nicolas | Putin: Medvedev | Obama: Barack |
| Microsoft - Windows | Google: Android | IBM: Linux | Apple: iPhone |
| Microsoft - Ballmer | Google: Yahoo | IBM: McNealy | Apple: Jobs |
| Japan - sushi | Germany: bratwurst | France: tapas | USA: pizza |

Source: *Efficient Estimation of Word Representations in Vector Space* - Mikolov, Chen, Corrado et al.

relative distance of vectors in the space

'out of the list' problems

Example: hand, glove, nails, cow

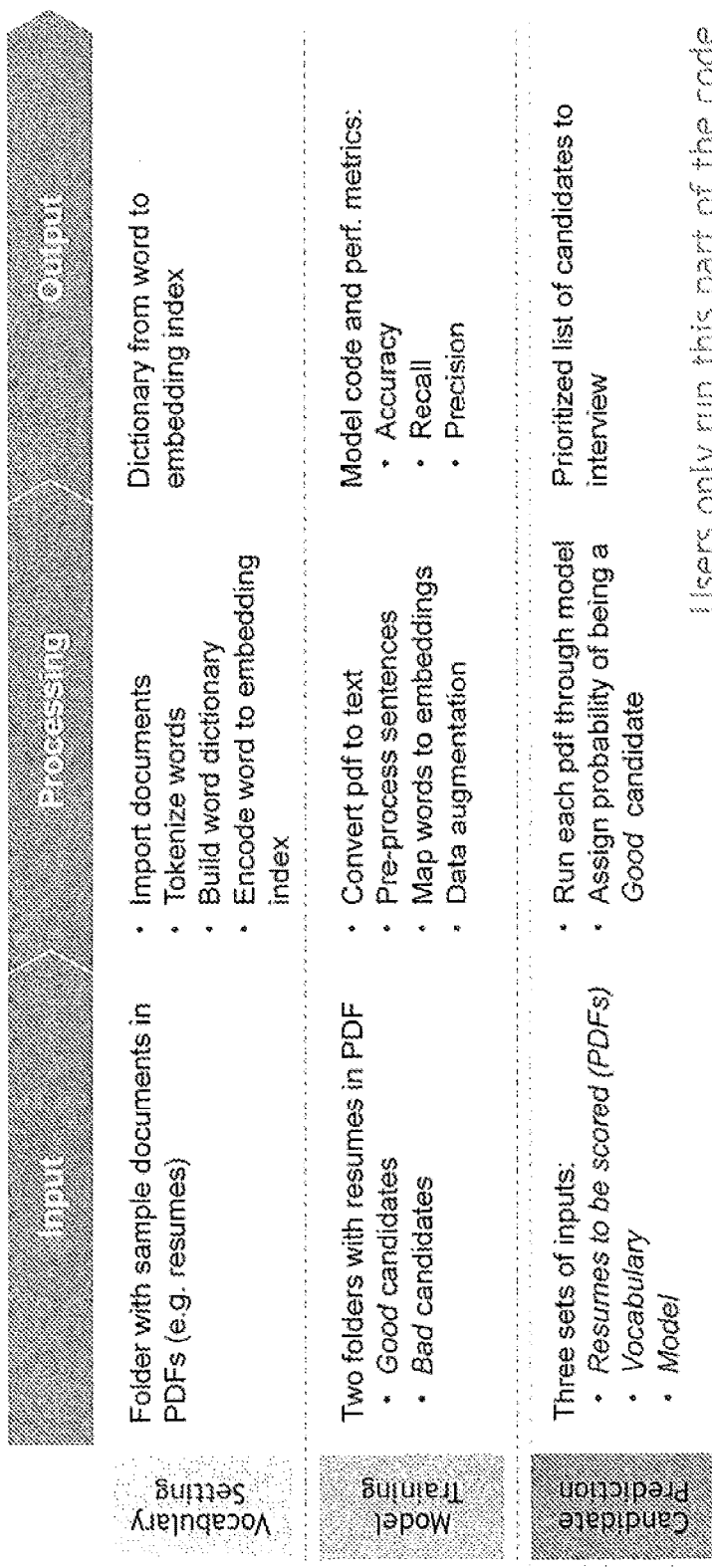
FIGURE 4: Model is flexible and can be trained to learn different goals and vocabularies

FIGURE 5

```
def convert_pdf_to_txt(path):
# PDF TO TEXT CONVERTER CODE
# REQUIRES LIRARY PDFMINER.SIX in Python 3
    from pdfminer.pdfinterp import PDFResourceManager, PDFPageInterpreter
    from pdfminer.converter import TextConverter
    from pdfminer.layout import LAParams
    from pdfminer.pdfpage import PDFPage
    try:
        from cStringIO import StringIO
    except ImportError:
        from io import StringIO import sys
    #reload(sys) Python 2.7
    #sys.setdefaultencoding('utf-8') python 2.7
    rsrcmgr = PDFResourceManager()
    retstr = StringIO()
    codec = 'utf-8'
    laparams = LAParams()
    device = TextConverter(rsrcmgr, retstr, codec=codec, laparams=laparams)

#fp = file(path, 'rb') #-- python2.7
    fp = open(path, 'rb') #py 3
    interpreter = PDFPageInterpreter(rsrcmgr, device)
    password = ""
    maxpages = 0
    caching = True
    pagenos=set()

for page in PDFPage.get_pages(fp, pagenos, maxpages=maxpages, password=password,caching=caching, check_extractable=True):
        interpreter.process_page(page)

text = retstr.getvalue()

fp.close()
    device.close()
    retstr.close()
    return text
```

FIGURE 6A

```
#Text pre-processing
def text_pre_process (doc):

import re set all text to lowercase
    doc_x = doc.lower()

#remove all Hex characters
    doc_x = re.sub(r'[^\x00-\x7f]',r' ', doc_x)

#remove puctuation characters
    import string
    #string.punctuation doc_x = doc_x.translate(None, string.punctuation) --- Py2
    #table =str.maketrans(dict.fromkeys(string.punctuation)) # Py3
    #doc_x = doc_x.translate(table) # py 3 translator = re.compile('[%s]' % re.escape(string.punctuation))
    doc_x = translator.sub(' ', doc_x)

#remove word "cid120"
    doc_x = re.sub(r"cid120", "", doc_x)

#compile the regex expression, remove all 'space' characters and split document into word tokens
    regex = re.compile("\s+")
    tokens = [x.strip() for x in regex.split(doc_x)]
    return tokens
```

FIGURE 6B

Example: *index: 'token', count*
```
0: 'and', 15165
1: 'of', 9036
2: 'to', 6904
3: 'the', 6694
4: 'in', 6060
5: 'data', 5069
```

FIGURE 6C

Example: *index: 'token'*

| | |
|---|---|
| 1: 'and', | 26: 'project', |
| 2: 'of', | 27: 'developed', |
| 3: 'to', | 28: 'from', |
| 4: 'the', | 29: 'learning', |
| 5: 'in', | 30: '2014', |
| 6: 'data', | 31: 'experience', |
| 7: 'for', | 32: 'as', |
| 8: 'a', | 33: 'models', |
| 9: 'with', | 34: 'new', |
| 10: 'on', | 35: 'team', |
| 11: 'analysis', | 36: 'engineering', |
| 12: 'using', | 37: 'at', |
| 13: 'business', | 38: 'python', |
| 14: 'university', | 39: 'sql', |
| 15: 'analytics', | 40: 'com', |
| 16: 's', | 41: 'an', |
| 17: 'by', | 42: 'customer', |
| 18: 'research', | 43: 'machine', |
| 19: 'management', | 44: 'development', |
| 20: 'r', | 45: 'based', |
| 21: '2015', | 46: '2013', |
| 22: '2016', | 47: 'c', |
| 23: 'cid', | 48: '2012', |
| 24: 'model', | 49: 'statistical', |
| 25: 'science', | 50: 'may' |

FIGURE 7A

```
yes_pdf = []
yes_pdf += [pdf for pdf in os.listdir(data_path+"pdf_yes") if pdf.endswith('.pdf')]

dset = pd.DataFrame({'NAME': yes_pdf, 'proceed': 1 })

no_pdf =[]
no_pdf += [pdf for pdf in os.listdir(data_path+"pdf_no") if pdf.endswith('.pdf')]
dset_no = pd.DataFrame({'NAME': no_pdf, 'proceed': 0 })
dset = dset.append(dset_no, ignore_index = True)
```

FIGURE 7B

```
def join_cv(x):

resume = x.NAME try:
        x['txt_cv'] = convert_pdf_to_txt(data_path+'pdf_yes/'+ resume)
    except FileNotFoundError:
        x['txt_cv'] = convert_pdf_to_txt(data_path+'pdf_no/'+ resume)

x['cv_token'] = text_pre_process(x.txt_cv)
    x['cv']= encode_cv(x.cv_token)

print ("imported and encoded: "+ resume + ", encoded resume lenght: " +str(len(x.cv)))

return x
```

```
# encodes a pre-processed text cv into a list of dictionary word indexes
def encode_cv(cv_tokens):
    cv_coded=[]
    # IF A TOKEN DOES NOT EXIST IN VOCABULARY, IT GETS REPLACED BY A VERY HIGH NUMBER
    # THIS WILL HELP AVOIDING RE BUILDING THE VOCABULARY
    # EACH TIME A NEW RESUME GETS ADDED.
    # HIGH NUMBER TOKENS ARE TRIMMED DURING THE dnn PREPROCESSING STEP ANYWAY high_num = 1000000
    for i in cv_tokens:
        try:
            cv_coded += [dict2idx[i]]
        except KeyError :
            cv_coded += [high_num]

return cv_coded
```

FIGURE 7C

```
sampling by group using index random.seed(11)
train_percentage = 0.7 tr = dset_cv[ dset_cv.index.isin(random.sample(range(dset_cv.index.max()+1),
                        (int(dset_cv.index.max()* train_percentage))))]

te = dset_cv[ ~dset_cv.index.isin(set(tr.index))]

Checks that no data has been left behind by the sample procedure set(dset_cv.index) - set(tr.index) - set(te.index)
df[df.some_key.isin(random.sample(df.some_key.unique(),2))].groupby('some_key').mean()
```

FIGURE 8

```
def shuf(x):
    resume = x.NAME print ("creating shuffled copy for: " + resume )

sentences = x['txt_cv'].split("\n")
    random.shuffle(sentences)
    shuf_resume= ''.join (sentences)
    x['txt_cv'] = shuf_resume
    x['cv_token'] = text_pre_process(x.txt_cv)
    x['cv']= encode_cv(x.cv_token)
    return x
```

FIGURE 9A

```
# replace non-frequent indexes with index 5000
vocab_size = 5000
tr['cv_cast'] = [ [ i if i<vocab_size-1 else vocab_size-1 for i in s] for s in tr.cv]
te['cv_cast'] = [ [ i if i<vocab_size-1 else vocab_size-1 for i in s] for s in te.cv]

#Remove rows where cv is shorter than min_len words
min_len = 100
tr= tr[tr.lens > min_len]
te= te[te.lens > min_len]

pad sequences from keras.preprocessing.sequence import pad_sequences
seq_len = 1000

X_train = pad_sequences(tr.cv_cast, maxlen=seq_len, value = 0)
X_test = pad_sequences(te.cv_cast, maxlen=seq_len, value = 0)
```

FIGURE 9B

```
model_name = "CNN_1"

dof = 0.2 batch_m = 1 conv1 = Sequential([
  Embedding(vocab_size+1, 100, input_length=seq_len),
  Dropout(dof),
  Convolution1D(12, 3, padding='same', activation='relu'),
  Dropout(dof),
  MaxPooling1D(),
  Convolution1D(12, 3, padding='same', activation='relu'),
  Dropout(dof),
  MaxPooling1D(),
  Flatten(), Dense(10, activation='relu'),
  Dropout(0.7),
  Dense(1, activation='sigmoid')])
```

FIGURE 9C

| | | | | | | |
|---|---|---|---|---|---|---|
| If the embedding vectors are set to be of length 100 and the sentence is "developed a science project in python", the matrix will have 6 rows and 100 columns: | | | | | | |
| Word | Word index | Embedding value 1 | Embedding value 2 | Embedding value 3 | ... | Embedding value 100 |
| developed | 27 | 0.605535 | 0.798256 | 0.065099 | ... | 0.301716 |
| a | 8 | 0.966988 | 0.475822 | 0.291712 | ... | 0.449579 |
| science | 25 | 0.620800 | 0.519680 | 0.211911 | ... | 0.560348 |
| project | 26 | 0.026228 | 0.243724 | 0.630171 | ... | 0.172001 |
| in | 5 | 0.745275 | 0.005143 | 0.224132 | ... | 0.067053 |
| python | 38 | 0.721791 | 0.692027 | 0.824338 | ... | 0.245288 |

FIGURE 10

```
exp = cand_dset_cv.loc[:,['NAME', 'follow_up', 'probability','review']]

#save exp to csv
timestr=time.strftime('%Y%m%d_%H%M%S')
exp.sort_values(by = 'probability', ascending = False , inplace = True)
#exp.to_csv(scoring_path + timestr + "_scores.csv")

#save to excel
from pandas import ExcelWriter
writer = ExcelWriter(scoring_path + timestr + '_scores.xlsx')
exp.to_excel(writer, sheet_name= timestr+'_results')
writer.save()
```

METHODS AND SYSTEMS FOR SCREENING DOCUMENTS

CROSS-REFERENCE TO RELATED APPLICATIONS

This application claims the benefit of U.S. Provisional Application Nos. 62/621,404 filed Jun. 24, 2018. All of the foregoing are incorporated by reference in its entirety.

BRIEF DESCRIPTION OF THE DRAWINGS

FIG. 2 provides an example of word-to-vector encoding, according to an embodiment of the invention.

FIG. 3 provides examples of how vector algebra can be used with word vectors, according to an embodiment of the invention.

FIG. 4 illustrates how the system can be flexible and trained to learn different goals and vocabularies, according to an embodiment of the invention.

FIG. 5 illustrates an example of PDF to text transformation, according to an embodiment of the invention.

FIGS. 6A, 6B and 6C illustrates an example of tokenization, according to an embodiment of the invention.

FIGS. 7A, 7B and 7C illustrate an example of resume input and process, according to an embodiment of the invention.

FIG. 8 illustrates an example of data augmentation, according to an embodiment of the invention.

FIGS. 9A, 9B and 9C illustrate an example of a deep neural network, according to an embodiment of the invention.

FIG. 10 illustrates an example of predicting candidate goodness, according to an embodiment of the invention.

DESCRIPTION OF EMBODIMENTS OF THE INVENTION

Figure 1A:
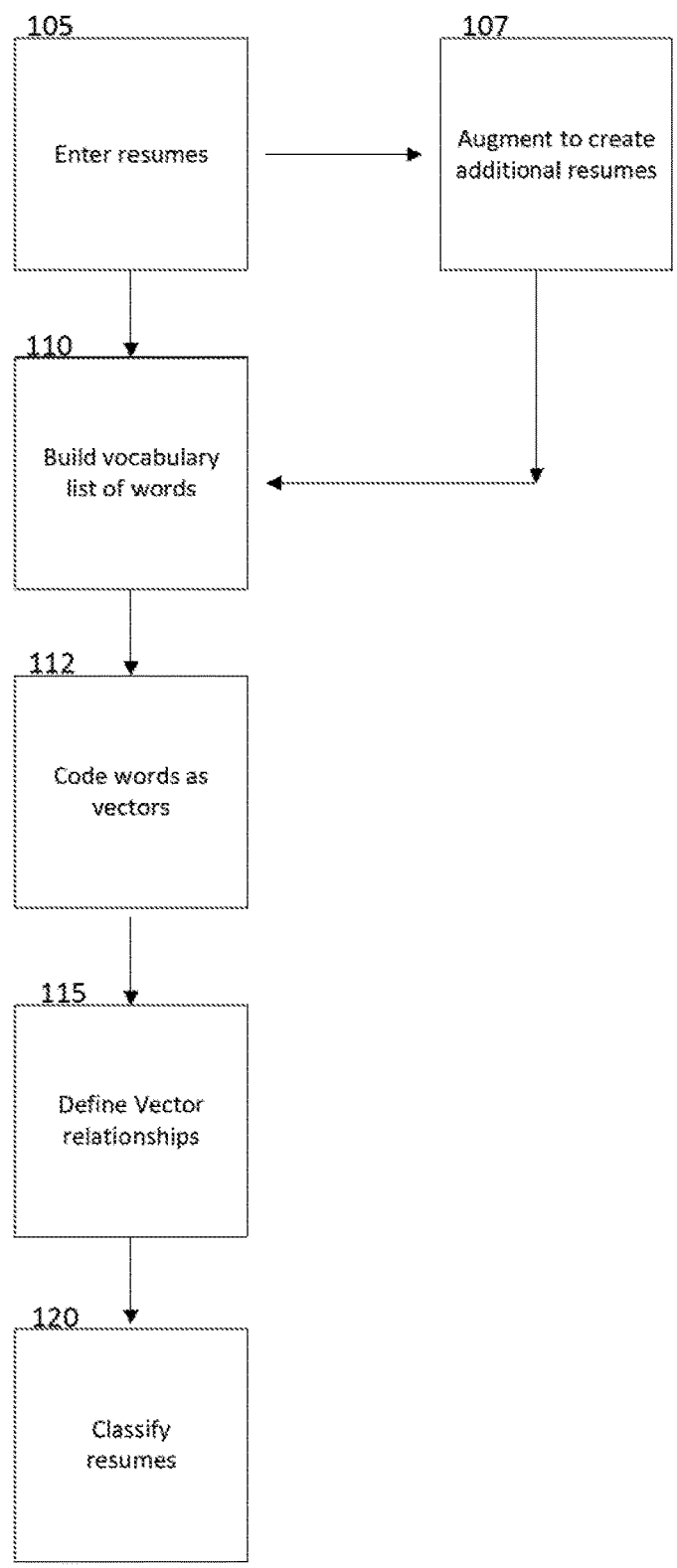
FIGS. 1A-1B illustrate example processes for screening resumes, according to embodiments of the invention.

FIG. 1A illustrates a process for screening resumes, according to an embodiment. In 105, resumes can be entered. In some embodiments, the resumes can be entered in pdf format and converted to text. In 107, augmentation can be done on the resumes to create additional resumes. (These can be used, for example, in training the system.) In 110, a vocabulary list can be built for the position of interest. In 112, each word in the vocabulary list can be coded as a vector using word embedding. In 115, vector relationships can be defined. In 120, a classification (e.g., based on a relevance probability score) for each resume can be output.

Figure 1B:
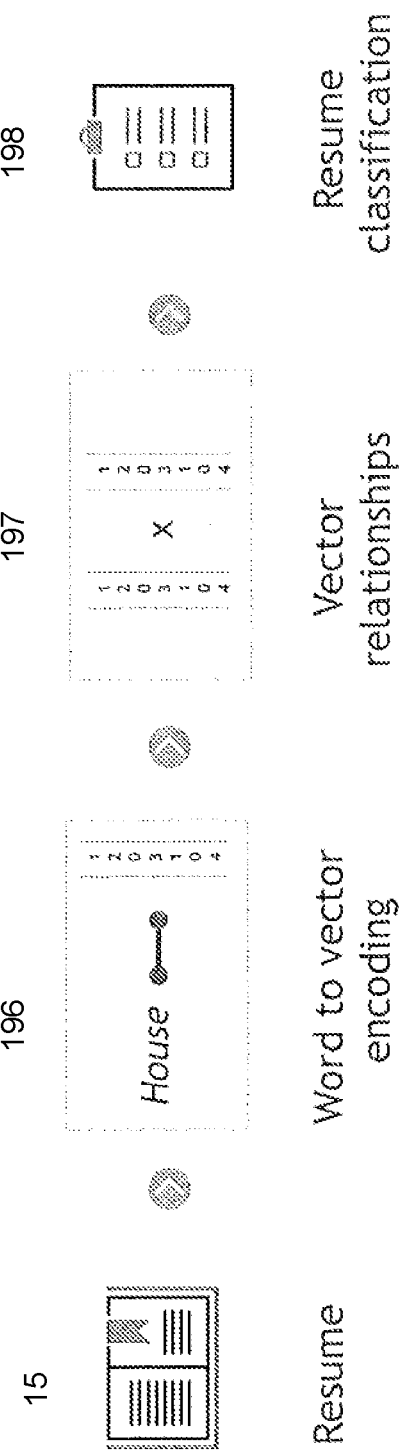

FIG. 1B illustrates an overview process for screening resumes, according to an embodiment. In FIG. 1B, resumes can be classified in a learning process based on content learned from relevant samples. In 195, words from resumes are input. In 196, each word of the resumes can be transformed into a series of numbers (e.g., vectors), which can be called embeddings. In 197, the deep neural network can learn the vector values using the relationships that adjacent words have in classifying good and bad resumes. In 198, each resume can be transformed into a set of previously learned word vectors which can be used to determine a classification score which reflect the possibility that a candidate is worth pursuing.

Figure 1C:
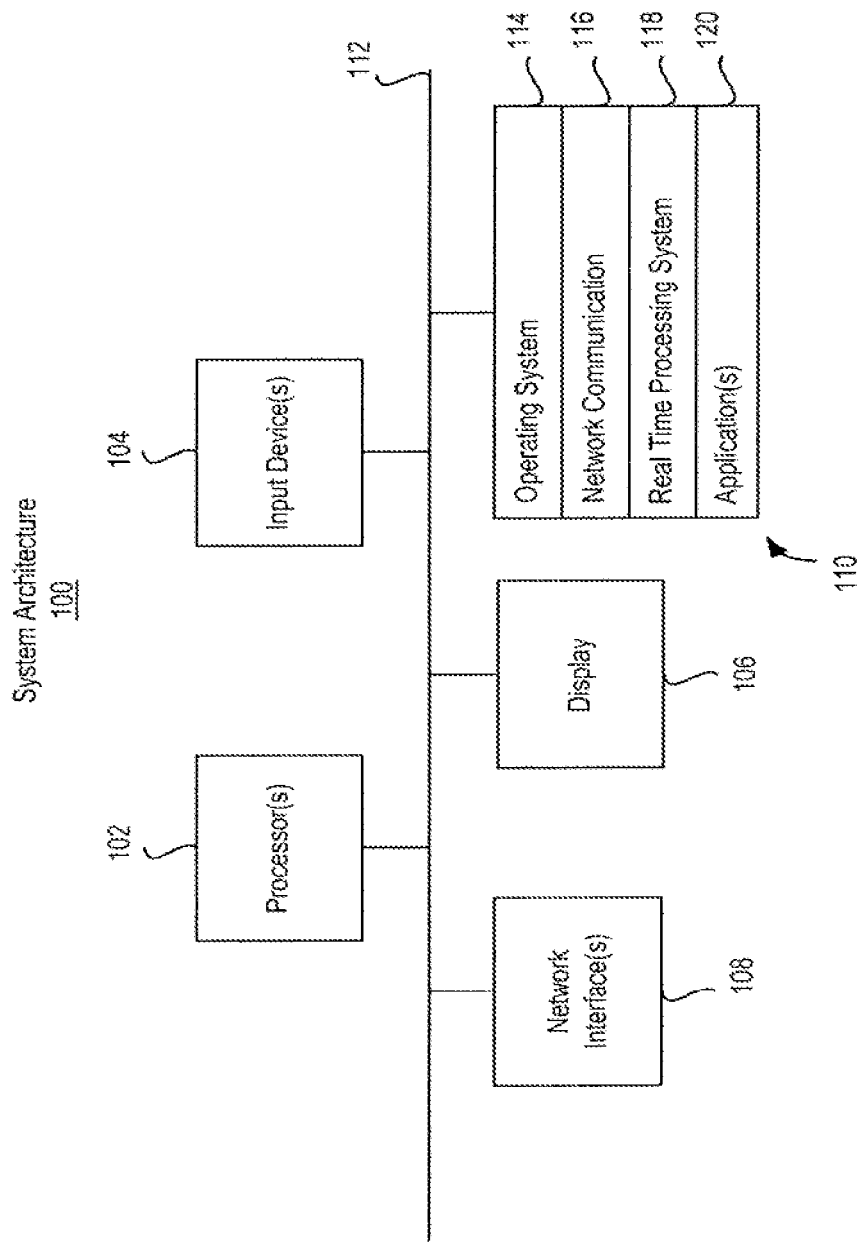
FIGS. 1C and 1D illustrate example systems for screening resumes, according to an embodiment of the invention.

FIG. 1C illustrates a block diagram of an example system architecture 100 implementing the features and processes described herein. The architecture 100 may be implemented on any electronic device that runs software applications derived from compiled instructions, including without limitation personal computers, servers, smart phones, media players, electronic tablets, game consoles, email devices, etc. In some implementations, the architecture 100 may include one or more processors 102, one or more input devices 104, one or more display devices 106, one or more network interfaces 108, and one or more computer-readable mediums 110. Each of these components may be coupled by bus 112.

Display device 106 may be any known display technology, including but not limited to display devices using Liquid Crystal Display (LCD) or Light Emitting Diode (LED) technology. Processor(s) 102 may use any known processor technology, including but not limited to graphics processors and multi-core processors. Input device 104 may be any known input device technology, including but not limited to a keyboard (including a virtual keyboard), mouse, track ball, and touch-sensitive pad or display. Bus 112 may be any known internal or external bus technology, including but not limited to ISA, EISA, PCI, PCI Express, NuBus, USB, Serial ATA or FireWire. Computer-readable medium 110 may be any medium that participates in providing instructions to processor(s) 102 for execution, including without limitation, non-volatile storage media (e.g., optical disks, magnetic disks, flash drives, etc.), or volatile media (e.g., SDRAM, ROM, etc.).

Computer-readable medium 110 may include various instructions 114 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 104; sending output to display device 106; keeping track of files and directories on computer-readable medium 110; controlling peripheral devices (e.g., disk drives, printers, etc.) which can be controlled directly or through an I/O controller; and managing traffic on bus 112. Network communications instructions 116 may establish and maintain network connections (e.g., software for implementing communication protocols, such as TCP/IP, HTTP, Ethernet, etc.).

Figure 1D:
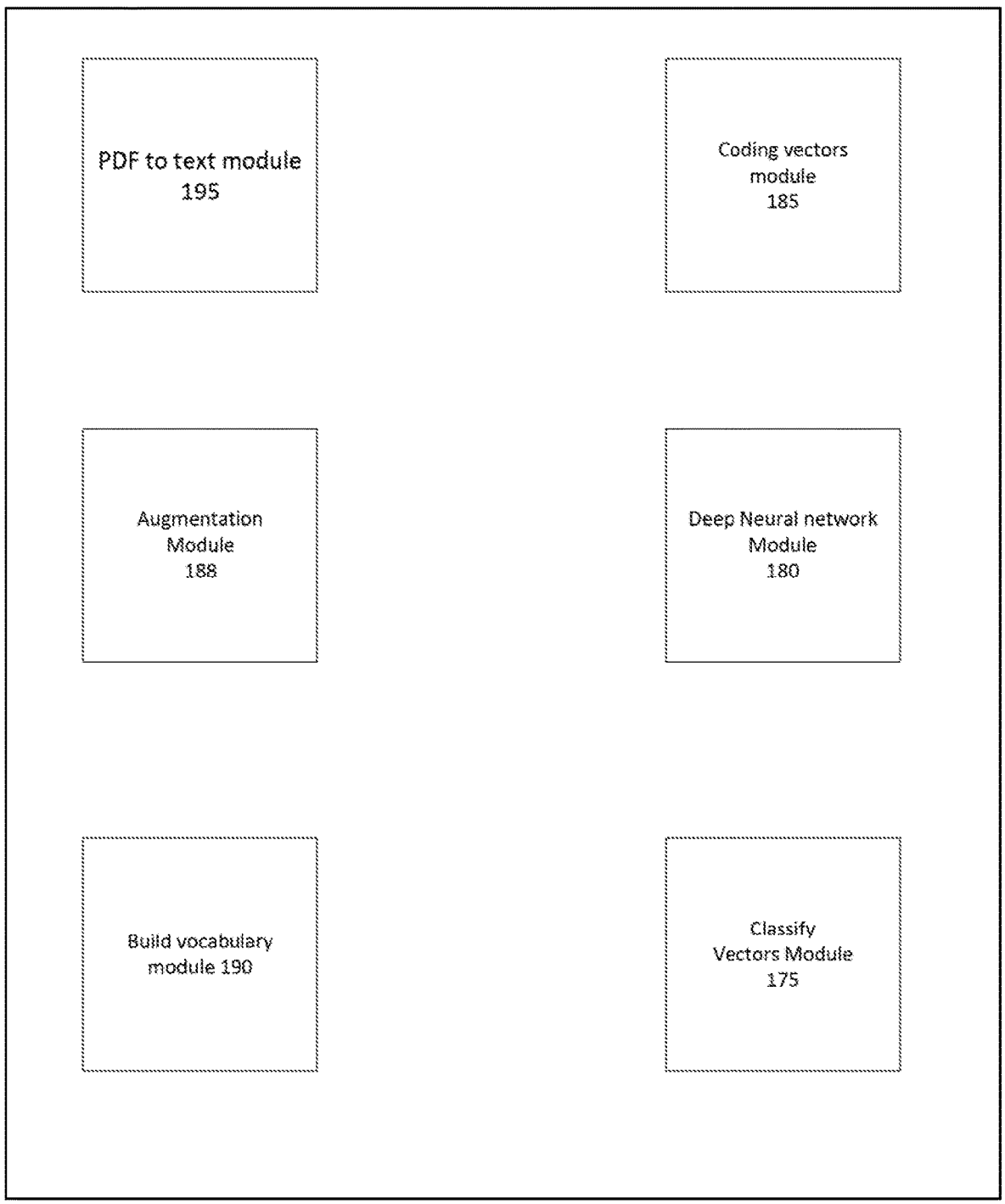

FIG. 1D illustrates a system 199 for screening documents, according to an embodiment. This system comprises: a PDF to text module 195, an augmentation module 188, a build vocabulary module 190; a coding words module 185, a deep neural network module 180, and a classify resumes module 175.

FIG. 2 provides an example of how embeddings can encode and summarize relevant features. For example, the word HOUSE can be turned into a vector using word-to-vector encoding. The vectors can comprise latent or unknown vectors that the system determines are relevant. Mathematically speaking, embeddings can be mappings. Size can be a part of designing the problem solution. Each word (e.g., 172,000 in the English vocabulary) can be a dimension. The features can be about a word's syntax and semantic context captured by learning the embeddings.

FIG. 3 provides examples of how vector algebra can be used with the word vectors. In FIG. 3, the algebra of vectors can mimic the correct interpretation of English words, using latent features vectors (i.e. embeddings). As a very simply example, if the system recognizes that a "good" resume will have a sum of 12, then any combination of vector values that reaches 12 can indicate that that resume is a good resume. So if two vectors have a value of 1 and 5, then the sum is 6, and this would not be a "good" resume. However, if two word vectors have a sum of 13, then this would be considered a "good" resume.

The screening process can be utilized to determine the probability that a resume is of interest. For example, if 1000 resumes are submitted for a particular position, the screening process can provide a probability of relevance for each resume and rank the order of the resumes according to the probability of relevance rankings In this way, a hiring person can determine almost immediately which resumes are the most important. This may be valuable, for example, when it is important to make an early contact for a prime candidate for a position, rather than waiting several weeks or months to get to that particular resume in a list or pile of resumes. This process can also, for example, cut down significantly on the amount of time it takes to review resumes. For example, when a probability is given for each resume, a hiring person can start reviewing the resumes with the highest probabilities first in order to maximize the chances that the most relevant or desirable hires are reviewed and interviewed first. The screening process can also, for example, cut down on the time it takes to interview a candidate. For example, if a resume is determined to be a very good candidate, the first pre-screening interview can focus on language skills and personality, instead of qualifications, which can result in a significant reduction of the time spent in the first interview.

In some embodiments, resumes that are determined to have a low probability of relevance can be reviewed, and if it is determined that they should have a higher probability of relevance, these can be fed into the system in order to better train the system. In a similar way, resumes that are determined to have a high probability of relevance can be reviewed, and if it is determined that they should have a lower probability of relevance, these can be fed into the system in order to better train the system.

FIG. 4 illustrates how the system can be flexible and trained to learn different goals and vocabularies. For example, with respect to the vocabulary setting, sample documents (e.g., resumes) in PDF format can be input into the system. The PDF documents can be imported into the system, and the words can be tokenized. A dictionary of vocabulary words can be created. The vocabulary words can be used to embed an index.

With respect to the model training, two folders of PDF documents can be created, one with examples of good candidates or resumes, and one with examples of bad candidates or resumes. The PDF documents can be converted to text. Sentences in the resumes can be pre-processed. The words can be mapped to embeddings. The data can then be augmented. A model code and performance metrics can be output with accuracy, recall (e.g., true positives divided by the sum of true positives and false negatives) and precision (e.g., true positives divided by the sum of the true positives and the false positives) information.

With respect to candidate predictions, three set of data may be input: resumes (in PDF format) to be scored, the relevant vocabulary list, and the model. Each PDF document can be run through the model and a probability of being a good candidate can be assigned. The output can be a prioritized list of candidates to interview.

EXAMPLE EMBODIMENTS

Vocabulary Building.

In some embodiments, the following process can be used to build the vocabulary.
1. Import resume file names into a dataframe.
2. For each line of the dataframe.
   a. Read the resume file name.
   b. Import the PDF file.
   c. Transform the PDF into text and append it as a column of the dataframe.
   d. Process the text and append the list of words as a column of the dataframe.
   e. Calculate the number of words in each resume and append it as a column to the dataframe.
3. Create a set including all the words in the resumes.
4. Count how many times each word appears.
5. Sort words by count in descending order.
6. Create a dictionary of vocabulary words using number to word matching based on previous sorting.

PDF to Text Transformation.

In some embodiments, the following process can be used to transform the pdf document to text.
1. Create a list of words (e.g., English, French, any language) present in all the resumes we are going to examine. Each word can be called a "token".
2. The resumes used as input can be stored in PDF, which can be the format candidates use to submit the resume in order to apply to a job. Because the PDF format may not allow immediate token identification and manipulation, we can transform the PDF documents into text documents using the example function set forth in FIG. 5 which takes a PDF document as input and returns a text version of the document as output. The function in FIG. 5 can be re-used at any stage of the process to transform a PDF into text. For example, this process can be used on a batch of resumes being used to train the model. This function can also be used when a new pdf resume is received and checked to see if it is good (e.g., a desirable candidate). In both these cases pdf files need to be transformed into text. Of course, if a resume is received in a format other than PDF, it can be easily converted into PDF using standard PDF technology and then the PDF document can be transformed into text.

Tokenization.
1. Once the PDF documents have been transformed into text, the tokens (e.g., words) can be extracted. FIG. 6A illustrates an example function where a text file is input, and a set of tokens are output. The text can be split into words, sentences, and/or paragraphs using a set of regular expressions and character based rules (e.g., using Regex). This function can be re-used at any stage of the process to tokenize text. For example, this function can be used on a batch of resumes being used to train the model, but can also be used when a new pdf resume is received and is being checked for the probability of the resume being a good one. In both cases, the text can be tokenized.
2. Once we have the tokens, we can count how many times each word appears in the corpus (e.g., the set of documents considered) as shown in FIG. 6B.
3. When we have the count of how many times each word appears in the corpus (e.g., the body of resumes), we can sort those words in decreasing order (e.g., the words with the highest count appear first) as shown in FIG. 6C and we can assign each word their ranking number (e.g., index) in this special sorted list. If you have two words appearing the exact same number of times, in some embodiments, they can be given subsequent numbers in alphabetical order.

Training.

The training procedure can assume there is a set of resume PDF documents that have been stored in two different folders. Folder "yes" can include candidates that have been deemed to be successful in the past after a pre-screening hiring round by a hiring team of person(s). Folder "no" can include candidates who did not pass the pre-screening hiring round by the hiring team of person(s). In some embodiment, the following process can be used, For example, using Python as the coding language, with a Keras library and a TensorFlow backend.

1. Import resume file names from the "yes" folder into a dataframe.
2. Create a column "proceed".
3. For each resume append the value 1 in the column "proceed".
4. Import resume file names from the "no" folder into a dataframe.
5. For each resume append the value 0 in the column "proceed".
6. For each line of the dataframe:
   a. Read the resume file name.
   b. Import the PDF file.
   c. Transform the PDF into text and append it as a column of the dataframe.
   d. Process the text and append the list of words as a column of the dataframe.
   e. Transform list of word into a list of indexes using the pre-built vocabulary and append it to the dataframe.
7. Split dataset into train and validation randomly (e.g., using known machine learning techniques).
8. Augment data by using a sentence and/or paragraph shuffling procedure. This can be done only for the train dataset in some embodiments.
9. Append the additional resumes created in the previous step to the training dataset.
10. Pre-process data to feed Deep Neural networks.
11. Train Deep Neural networks.

Resume Import and Processing.

The example function of FIG. 7A can be used to import resumes and mark them as "good" (=1) or "bad" (=0). We can then proceed to transform the resume into a list of indexes using the vocabulary. This can be done using an example procedure join_cv shown in FIG. 7B, which can use a supporting function named encode_cv. Once we have transformed the resume into a list of word indexes based on the predetermined vocabulary, as shown in FIG. 7C, we can proceed with a typical machine learning step of splitting our data into: 1) a training dataset, which can be used to determine the model parameters; and 2) a validation dataset, which can be used to test the generalization of the model. Once we have determined the training set, we can proceed with the data augmentation technique.

Data Augmentation.

Because machines learn from examples, it is quite helpful to have more examples (e.g., hundreds or thousands or more). By using the fact that sentences resumes are quite independent, we can create "new" example resumes by shuffling sentences belonging to the resume around. This technique can improve the prediction power of the model. For example, in FIG. 8, the text document for the resume can be split into segments by finding the end of the paragraph and/or sentence (e.g., in the code in FIG. 8, we refer to these segments as "sentences"), which can be designated in the text by a return, which can be designated in the text as "\n". We can then use the Python instruction 'random.shuffle( )' to shuffle the sentences around. The shuffled sentences can then be joined together to create new example resumes that can help teach the computer. For example, if we found 7 sentences in a particular resume, we could order those S1 to S7, and then shuffle them randomly so that we create several more example resumes. Thus, the original resume could be ordered S1, S2, S3, S4, S5, S6, and S7. After shuffling and joining together the shuffled sentences, we could have several other example resumes made of the same sentences. An example could be the resume including sentences in the following order: S2, S4, S7, S5, S1, S3, and S6. Once we have the new resumes, we can turn them into tokens and encode them. This process can be helpful when treating resumes as these documents usually include sentences and/or paragraphs and/or other portions that are independent from each other. The resulting 'shuffled' resumes are still resumes.

Deep Neural Network.

We are now ready to do some pre-processing of the encoded resumes before feeding them to our Deep Neural Network.

A deep neural network (DNN) is an ANN (Artificial Neural Network) with multiple hidden layers between the input and output layers.

<https://en.wikipedia.org/wiki/Deep_learning#Deep_neural_networks>. FIG. 9A is an example of pre-processing that comprises: eliminating non-frequent words, padding the text to make all resume the same length, removing resumes that are too short, etc. At this point, we can create the architecture of our deep neural network and start training it. For example, embeddings can be used so that word indexes can be mapped to random vectors of a fixed size (e.g. 100, 200, 300). Those vectors can get their numbers fixed during the training procedure. FIG. 9B illustrates an example of a Deep Neural Network using convolutional layers and word embeddings written in Keras. The embeddings value can create a matrix of a number of words in the resume×size of the embedding vector.

The following code represents a Deep Neural Network written in Keras

Each row is a layer of the network gets input from the previous layer, applies the layer specific transformations and provides its output as the following layer input.

Specific trasformations are:

Embedding(vocab_size+1, 100, input length=seq_len),

Transforms the resumes into a matrix with 100 columns

Dropout(0.2),

Randomly deletes 20% of the output of the embedding layer

Convolution1D(12, 3, padding='same', activation='relu'),

Applies a convolution operation to the output of the dropout layer and then applies a relu (rectified linear unit) function to it Dropout(dof), See above MaxPooling1D( ), Takes the maximum values of the output provided by the dropout layer Convolution1D(12, 3, padding='same', activation='relu'), See above Dropout(dof), See above MaxPooling1D( ),
See above
Flatten( ),
Transforms the output of the maxpooling layer into a long flat vector to be fed into the dense layer
Dense(10, activation='relu'),
Transforms the output of flatten layer and condenses it into 10 positive numbers
Dropout(0.7),
See above
Dense(1, activation='sigmoid')])
Transforms the output of dropout into 1 positive between 0 and 1 which represents the probability of the resume to be a 'good' one. FIG. 9C illustrates an example transformation of a resume sentence into a set of embeddings using a word index vocabulary. The embeddings values can be initialized randomly. The Deep Neural Network algorithm can find the ones that best fit our proposed purpose during the training procedure using an optimization algorithm such as, for example, the Stochastic Gradient Descent.

Stochastic gradient descent (often shortened to SGD), also known as incremental gradient descent, is a stochastic approximation of the gradient descent optimization and iterative method for minimizing an objective function that is written as a sum of differentiable functions.

<https://en.wikipedia.org/wiki/Stochastic_gradient_descent>. When we are finished training the model, we can save both the embeddings value and the model multipliers into a file.

Predicting Candidate "Goodness".

To predict how a new candidate will perform during pre-screening steps, we can load the model file and pass to it the PDF to get a prediction. The prediction process set forth below can be called scoring and for each resume it can return the predicted probability of the candidate passing an HR department's pre-screening tests.

1. Import resume into a dataframe
2. For each line of the dataframe.
   a. Read the resume file name.
   b. Import the PDF file.
   c. Transform the PDF into text and append it as a column of the dataframe.
   d. Process the text and append the list of words as a column of the dataframe.
   e. Transform list of word into a list of indexes using the pre-built vocabulary and append it to the dataframe.
   f. Apply same pre-processing steps as was done in the Deep Neural Network section.
3. Load model.
4. Feed resume to model.
5. Get prediction.
6. Output prediction to .csv file Once the PDF has been transformed into a sequence of indexes and pre-processed as described above, the scoring procedure comes from multiple transformations of the word vectors using model parameters found during training for the neural network functions. In very simplified terms, this transformation can be represented as $y(x)=f(x)$, where: y can be a predicted probability of a candidate being "good"; f can be the set of parametrized transformations happening as result of optimized neural network parameters determined by the Deep Neural Network algorithm during the model training procedure; and x can be the encoded resume (which can be translated into embeddings during the scoring procedure).

predictions = NN.predict(X_cand, verbose = 1)

The output can then reshaped to a nice .cvs format as illustrated in FIG. F1.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method for determining a probability of relevance for a new resume, comprising:
   choosing existing resumes that have a high probability of relevance for a position;
   building a vocabulary of words, in the existing resumes;
   mapping each word into a vector such that each existing resume is represented by a sequence of vectors and each sentence and/or paragraph in the resume is represented by a subsequence of vectors comprising a subset of the sequence of vectors;
   applying data augmentation comprising changing the order of subsequences in order to create additional resumes represented by subsequences;
   training a deep neural network using the subsequences that represent the existing resumes and the subsequences that represent the additional resumes
   classifying new resumes using a trained deep neural network; and
   outputting a relevant resume using the trained deep neural network.

2. The method of claim 1, wherein word to vector embedding is used to code the words as vectors.

3. The method of claim 1, further comprising:
   entering in resumes in a pdf format; and
   transforming the resumes from pdf to text.

4. The method of claim 1, further comprising:
   transforming each word into embeddings comprising a series of numbers in vectors.

5. The method of claim 1, wherein the deep neural network uses relationships between adjacent words to classify the new resumes.

6. The method of claim 1, further comprising:
   determining a classification score for each new resume using the vectors.

7. The method of claim 6, wherein the classification score is derived by summing the vectors.

8. The method of claim 7, further comprising:
reviewing a classified resume;
determining that the classified resume should have a different probability of relevance; and
using the classified resume to better train the system.

9. The method of claim 1, wherein the vocabulary is built of only frequent words, the frequent words comprising words used more than a pre-determined amount of times in the existing resumes; and each frequent word is mapped to a vector.

10. A system for determining a probability of relevance for a new resume, comprising:
a processor configured for:
choosing existing resumes that have a high probability of relevance for a position;
building a vocabulary of words;
mapping each word into a vector such that each existing resume is represented by a sequence of vectors and each sentence and/or paragraph in the resume is represented by a subsequence of vectors comprising a subset of the sequence of vectors;
applying data augmentation comprising changing the order of subsequences in order to create additional resumes represented by subsequences;
training a deep neural network using the subsequences that represent the existing resumes and the subsequences that represent the additional resumes;
classifying new resumes using a trained deep neural network; and
outputting a relevant resume using the trained deep neural network.

11. The system of claim 10, wherein word to vector embedding is used to code the words as vectors.

12. The system of claim 10, wherein the processor is configured for:
entering in resumes in a pdf format; and
transforming the resumes from pdf to text.

13. The system of claim 10, wherein the processor is configured for:
transforming each word into embeddings comprising a series of numbers in vectors.

14. The method of claim 10, wherein the deep neural network uses relationships between adjacent words to classify the new resumes.

15. The method of claim 10, wherein the processor is configured for:
determining a classification score for each new resume using the vectors.

16. The method of claim 15, wherein the classification score is derived by summing the vectors.

17. The method of claim 16, wherein the processor is configured for:
reviewing a classified resume;
determining that the classified resume should have a different probability of relevance; and
using the classified resume to better train the system.

18. The system of claim 10, wherein the vocabulary is built of only frequent words, the frequent words comprising words used more than a pre-determined amount of times in the existing resumes; and each frequent word is mapped to a vector.

* * * * *